(12) United States Patent
Hughes et al.

(10) Patent No.: US 7,984,150 B2
(45) Date of Patent: Jul. 19, 2011

(54) CELL COMPATIBILTY IN MULTIPROCESSOR SYSTEMS

(75) Inventors: Nathan Jared Hughes, Ft. Collins, CO (US); Stephen Patrick Hack, Livermore, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1022 days.

(21) Appl. No.: 11/888,269

(22) Filed: Jul. 31, 2007

(65) Prior Publication Data

US 2009/0037939 A1 Feb. 5, 2009

(51) Int. Cl.
*G06F 15/173* (2006.01)
(52) U.S. Cl. ............ 709/226; 709/221; 705/8; 718/104
(58) Field of Classification Search .................... 709/226
See application file for complete search history.

(56) References Cited

U.S. PATENT DOCUMENTS

| | | | | |
|---|---|---|---|---|
| 5,835,723 A * | 11/1998 | Andrews et al. | ............. | 709/226 |
| 6,230,200 B1 * | 5/2001 | Forecast et al. | ............. | 709/226 |
| 6,438,705 B1 * | 8/2002 | Chao et al. | ............. | 714/4.11 |
| 7,152,157 B2 * | 12/2006 | Murphy et al. | ............. | 713/100 |
| 7,191,329 B2 * | 3/2007 | Murphy | ............. | 713/100 |
| 7,487,258 B2 * | 2/2009 | Eilam et al. | ............. | 709/238 |
| 7,664,847 B2 * | 2/2010 | Colrain et al. | ............. | 709/224 |
| 7,673,052 B2 * | 3/2010 | Fried et al. | ............. | 709/226 |
| 7,703,102 B1 * | 4/2010 | Eppstein et al. | ............. | 718/104 |
| 7,716,336 B2 * | 5/2010 | Coppinger et al. | ............. | 709/226 |
| 2002/0049608 A1 * | 4/2002 | Hartsell et al. | ............. | 705/1 |
| 2002/0174227 A1 * | 11/2002 | Hartsell et al. | ............. | 709/226 |
| 2008/0028076 A1 * | 1/2008 | Gupta et al. | ............. | 709/226 |

* cited by examiner

*Primary Examiner* — Michael Won

(57) ABSTRACT

In one embodiment, a multiprocessor computer system comprises at least a first partition having a first operating system comprising logic to initiate a request to add a first cell to the first partition, open a communication interface between the first operating system and a firmware module on the first cell, and transmit from the first partition to the first cell a compatibility command, logic in the first cell to determine whether the first cell is compatible with the first partition, and logic in the first partition to add the first cell to the first partition in response to a determination that the first cell is compatible with the first partition.

14 Claims, 5 Drawing Sheets

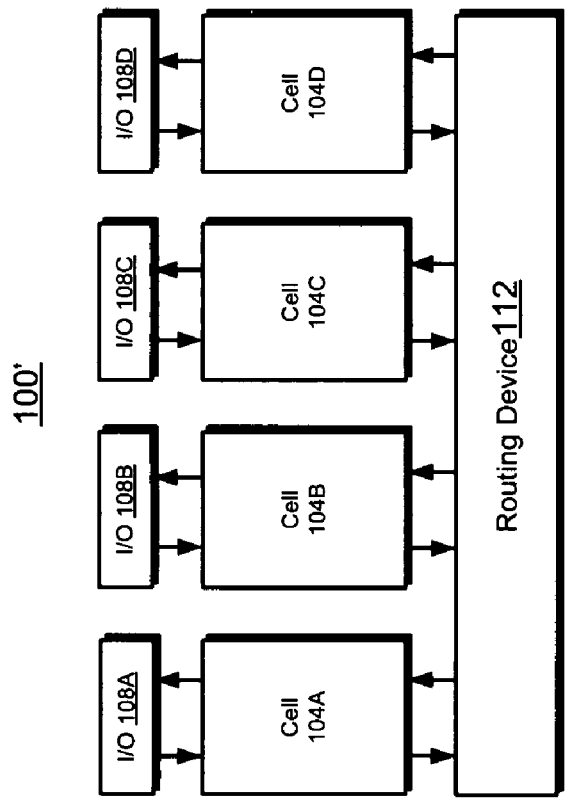
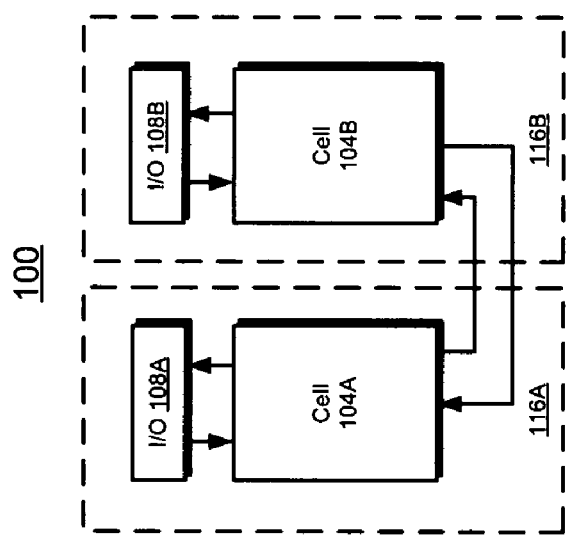
Fig. 1B
Fig. 1A

CELL COMPATIBILTY IN MULTIPROCESSOR SYSTEMS

BACKGROUND

High performance computer systems may utilize multiple processors to increase processing power. Processing workloads may be divided and distributed among the processors, thereby reducing execution time and increasing performance. One architectural model for high performance multiple processor system is the cache coherent Non-Uniform Memory Access (ccNUMA) model. Under the ccNUMA model, system resources such as processors and random access memory may be segmented into groups referred to as Locality Domains, also referred to as "nodes" or "cells". Each node may comprise one or more processors and physical memory. A processor in a node may access the memory in its node, sometimes referred to as local memory, as well as memory in other nodes, sometimes referred to as remote memory.

Multi-processor computer systems may be partitioned into a number of elements, or cells. Each cell includes at least one, and more commonly a plurality, of processors. The various cells in a partitioned computer system may run different operating systems, if desired. Typically, each partition runs a single operating system.

Many computer systems provide the ability to remove or eject hardware devices from the computer system. For example, some computer systems implement the Advanced Configuration and Power Interface (ACPI), which provides a method to remove hardware resources from an operating system while the operating system is running. This is sometimes referred to as a "hot" removal. In systems that implement the ACPI, system firmware may track which devices are removable and maintain status information relating to those devices.

In some circumstances, it may be useful to move one or more resources from one partition to another partition in a multiprocessor computer system. For example, most computer systems have multiple memory devices, ranging from cache memory to main memory devices including random access memory (RAM) devices (e.g., dynamic RAM or static RAM devices) as well as other types of memory such as read only memory (ROM) devices or external memory devices. In some computer systems, not only specific devices but also memory portions or locations within the various hardware devices also potentially are divisible and potentially allocable. Also for example, most computer systems have one or more processing devices (e.g., central processing units (CPUs) such as microprocessors), and the processing power of these devices can allocated to different processes.

In some computer systems the allocation of resources to the multiple processes of such conventional computer systems is rigidly fixed, either permanently when the computer systems are built or when the computer system are turned on or rebooted. Such rigid allocation of resources can be undesirable, since the needs of the processes can change over time during their operation.

BRIEF DESCRIPTION OF THE DRAWINGS

FIGS. 1A, 1B and 1C are schematic illustrations of one embodiment of a multiprocessor computer system according to embodiments.

DETAILED DESCRIPTION

Described herein are examples of multi-processor computer systems and of techniques to manage cell compatibility in multi-processor systems. In some implementations, the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1C:
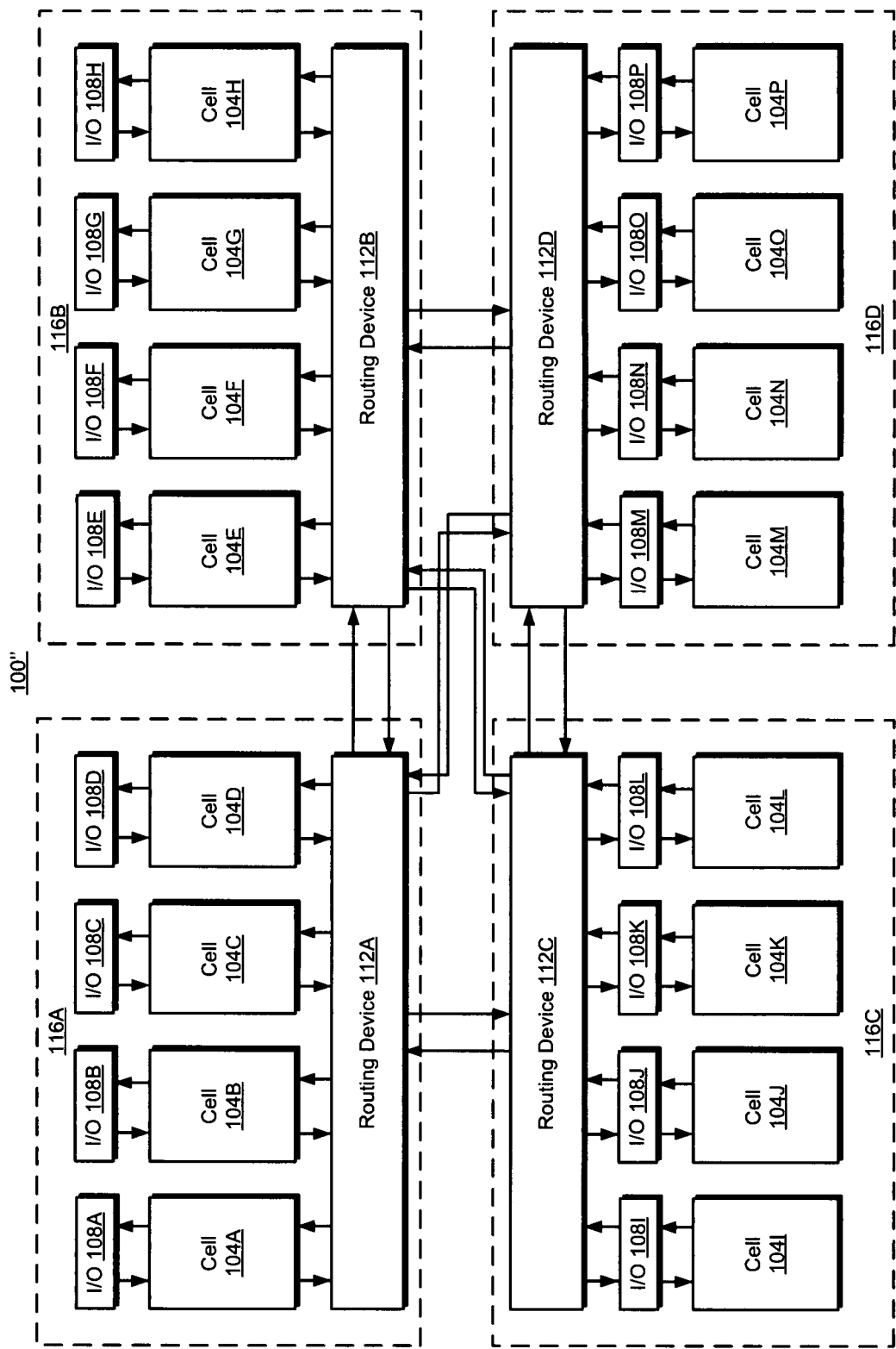

With reference to FIGS. 1A, 1B, and 1C, a partitionable computer system 100 can include a number of elements or cells 104. In FIG. 1A, only two cells 104A and 104B are present. However, more than two cells 104 can create the partitionable computer system 100. For example, FIG. 1B depicts a partitionable computer system 100' having four cells 104A, 104B, 104C, and 104D. In FIG. 1C, sixteen cells 104A, 104B, 104C, 104D, 104E, . . . 104P, create the partitionable computer system 100". Each cell 104 can communicate with a respective input and output module 108, which is used to provide input to the system 100 and output from the system 100.

In partitionable computer systems having more than two cells 104, for example systems 100' and 100" shown in FIGS. 1B and 1C, respectively, the cells 104 can communicate with each other through a routing device 112. The routing device can be a crossbar switch or other similar device that can route data packets. For example, a NUMAflex 8-Port Router Interconnect Module sold by SGI of Mountain View, Calif. can be used. The routing device 112 facilitates the transfer of packets from a source address to a destination address. For example, if cell 104A sends a packet to cell 104D, cell 104A sends the packet to the routing device 112, the routing device 112 in turn, transmits the packet to cell 104D.

In a larger partitionable computer system, such as the system 100" shown in FIG. 1C, there can be more than one routing device 112. For example, there can be four routing devices 112A, 112B, 112C, and 112D. The routing devices 112 collectively can be referred to as the switch fabric. The routing devices 112 can communicate with each other and a number of cells 104. For example, cell 104A, cell 104B, cell 104C and cell 104D can communicate directly with routing device 112A. Cell 104E, cell 104F, cell 104G, and cell 104H can communicate directly with routing device 112B. Cell 104I, cell 104J, cell 104K, and cell 104L can communicate directly with routing device 112C. Cell 104M, cell 104N, cell 104O, and cell 104P can communicate directly with routing device 112D. In such a configuration, each routing device 112 and the cells 104 that the routing device 112 directly communicates with can be considered a partition 116. As shown, in FIG. 1C there are four partitions 116A, 116B, 116C and 116D. As shown, each partition includes four cells, however; any number of cells and combination of cells can be used to create a partition. For example, partitions 116A and 116B can be combined to form one partition having eight cells. In one embodiment, each cell 104 is a partition 116. As shown in FIG. 1A, cell 104 can be a partition 116A and cell 104B can be a partition 116B. Although the embodiment depicted in FIG. 1C has four cells, other embodiments may have more or fewer cells.

Each partition can be dedicated to perform a specific computing function. For example, partition 116A can be dedicated to providing web pages by functioning as a web server farm and partition 116B can be configured to provide diagnostic capabilities. In addition, a partition can be dedicated to maintaining a database. In one embodiment, a commercial data center can have three tiers of partitions, the access tier (e.g., a web farm), application tier (i.e., a tier that takes web requests and turns them into database queries and then responds to the web request) and a database tier that tracks various action and items.

Figure 1D:
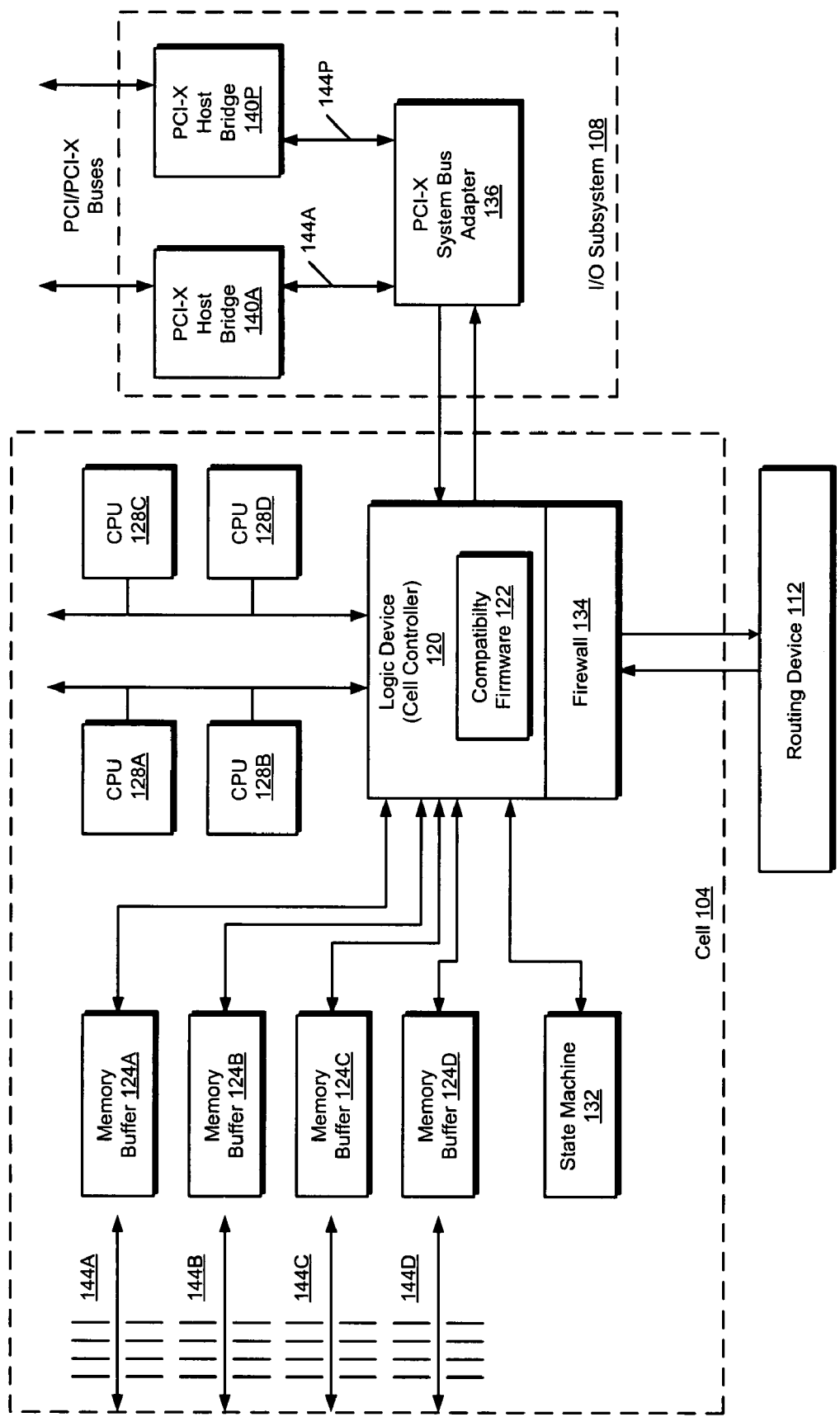
FIG. 1D is a block diagram of a cell, such as the cell depicted in FIG. 1B, according to some embodiments.

With reference to FIG. 1D, each cell 104 includes a logic device 120, a plurality of memory buffers 124A, 124B, 124C, 124D (referred to generally as memory buffers 124), a plurality of central processing units (CPUs) 128A, 128B, 128C, 128D (referred to generally as CPUs 128), a state machine 132, and a firewall 134. The term CPU is not intended to be limited to a microprocessor, instead it is intended to be used to refer to any device that is capable of processing. The memory buffers 124, CPUs 128, and state machine 132 each communicate with the logic device 120. When the cell 104 is in communication with a crossbar 112, the logic device 120 is also in communication with the crossbar 112. The logic device 120 is also in communication with the I/O subsystem 108. The logic device 120 can be any kind of processor including, for example, a conventional processor, a field programmable gate array (FPGA). The logic device 120 may also be referred to as the cell controller 120 through the specification. The logic device 120 includes a communications bus (not shown) that is used to route signals between the state machine 132, the CPUs 128, the memory buffers 124, the routing device 112 and the I/O subsystem 108. The cell controller 120 also performs logic operations such as mapping main memory requests into memory DIMM requests to access and return data and perform cache coherency functions for main memory requests so that the CPU and I/O caches are always consistent and never stale.

In one embodiment, the I/O subsystem 108 includes a bus adapter 136 and a plurality of host bridges 140. The bus adapter 136 communicates with the host bridges 140 through a plurality of communication links 144. Each link 144 connects one host bridge 140 to the bus adapter 136. As an example, the bus adapter 136 can be a peripheral component interconnect (PCI) bus adapter. The I/O subsystem can include sixteen host bridges 140A, 140B, 140C, . . . , 140P and sixteen communication links 144A, 144B, 144C, . . . , 144P.

As shown, the cell 104 includes fours CPUs 128, however; each cell includes various numbers of processing units 128. In one embodiment, the CPUs are ITANIUM based CPUs, which are manufactured by Intel of Santa Clara, Calif. Alternatively, SUN UltraSparc processors, IBM power processors, Intel Pentium processors, or other processors could be used. The memory buffers 124 communicate with eight synchronous dynamic random access memory (SDRAM) dual in line memory modules (DIMMs) 144, although other types of memory can be used.

Although shown as a specific configuration, a cell 104 is not limited to such a configuration. For example, the I/O subsystem 108 can be in communication with routing device 112. Similarly, the DIMM modules 144 can be in communication with the routing device 112. The configuration of the components of FIG. 1D is not intended to be limited in any way by the description provided.

Figure 2:
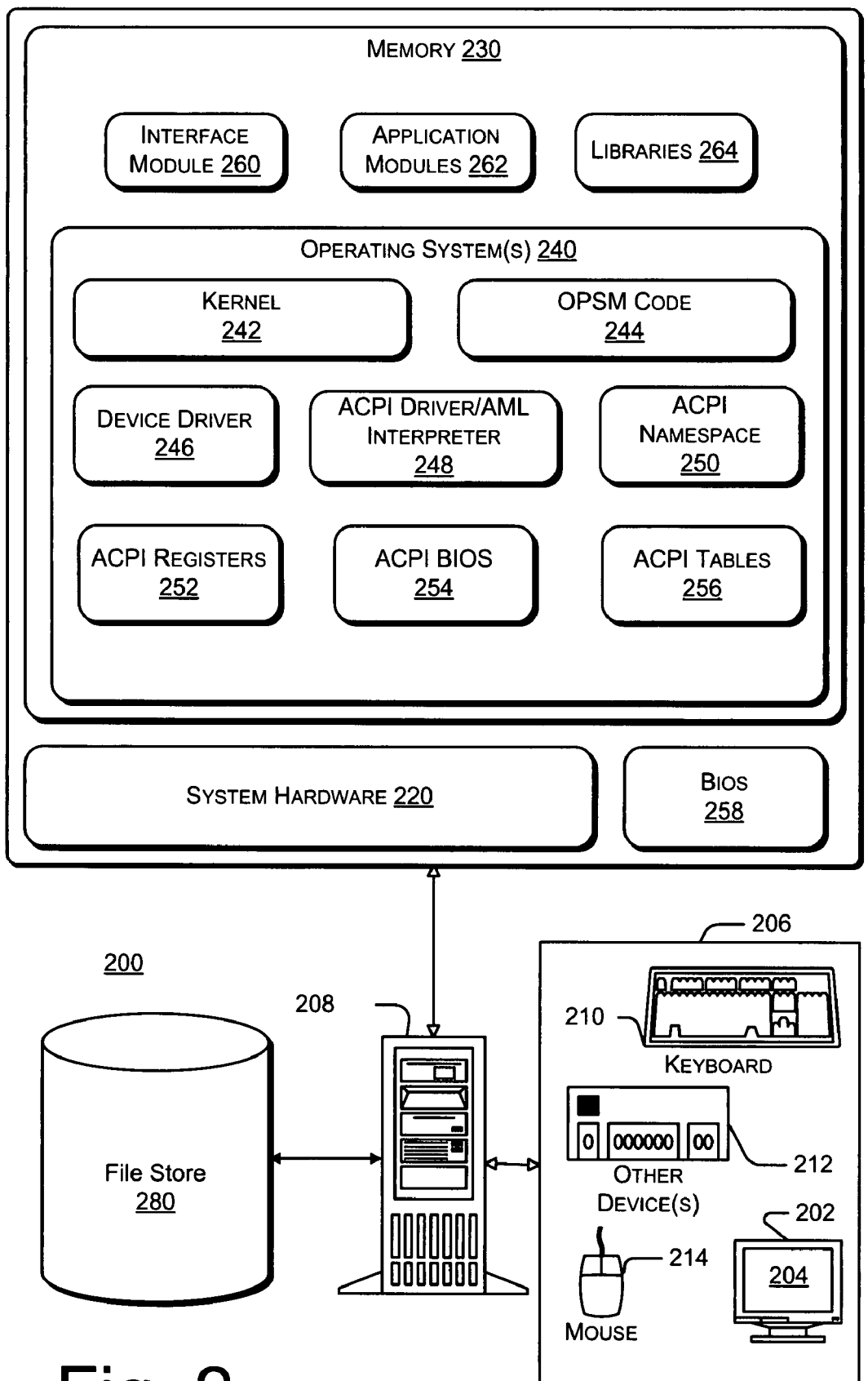
FIG. 2 is a schematic illustration of an embodiment of a computer system that may be used to implement a multiprocessor system as depicted in FIGS. 1A-1D.

FIG. 2 is a schematic illustration of an embodiment of a computer system 200 that may be used to implement a multiprocessor system as depicted in FIGS. 1A-1D. The computer system 200 includes a computer 208 and may include one or more accompanying input/output devices 206 including a display 202 having a screen 204, a keyboard 210, other I/O device(s) 212, and a mouse 214. The other device(s) 212 can include a touch screen, a voice-activated input device, a track ball, and any other device that allows the system 200 to receive input from a developer and/or a user. The computer 208 includes system hardware 220 and random access memory and/or read-only memory 230. A file store 280 is communicatively connected to computer 208. File store 280 may be internal such as, e.g., one or more hard drives, or external such as, e.g., one or more external hard drives, network attached storage, or a separate storage network.

Computer system 200 comprises one or more operating systems 240. In operation, one or more application modules 262 and/or libraries 264 executing on computer 208 make calls to the operating system 240 to execute one or more commands on the computer's processor. The operating system 240, in turn, invokes the services of system hardware 220 to execute the command(s). The operating system kernel 242 can be generally considered as one or more software modules that are responsible for performing many operating system functions.

As noted above, in a partitioned computer system each partition may operate a separate operating system 240. The particular embodiment of operating system(s) 240 is not critical to the subject matter described herein. Operating system 240 may be embodied as a UNIX operating system or any derivative thereof (e.g., Linux, Solaris, HPUX etc.) or as a Windows® brand operating system.

Computing system 200 further includes a number of components to facilitate ACPI management functions. Although the subject matter is with reference to ACPI table management, there is no intention to limit the claims to ACPI configuration systems. Rather, the subject matter describe herein may operate with and provide benefits with any operating system, architecture, and/or configuration management system.

In one embodiment, the kernel 242 interfaces with Operating System Power Management (OSPM) system code 244. The OSPM system code 244 comprises one or more software modules that may be a part of the operating system 205 and that may be used to modify the behavior of certain components of the computer system 200, typically to mange power consumption in accordance with pre-configured power conservation settings. The various device drivers 246 interface with and generally control the hardware installed in the computer system 200.

ACPI Driver/AML Interpreter 248 is a software module loaded during system start-up, which functions as an interface between the operating system 240 and an ACPI BIOS 254. ACPI Driver/AML Interpreter 248 populates an ACPI namespace 250 at system startup, loads description blocks from the system BIOS ACPI namespace at run time, handles certain general purpose events triggered by ACPI hardware, and passes other general purpose events to modules registered to handle those events, and the like.

A driver communicates with other drivers and the operating system components (e.g., an I/O manager or the kernel 242), for example in the Windows® 2000 operating system, by passing messages called I/O request packets (IRPs) up and down a "driver stack." As will be understood by those skilled in the art, drivers for a particular hardware device may be "stacked" such that messages directed either down to the hardware device or back up to the operating system (or other program module) are passed through a chain of drivers in a driver stack before reaching their destination. An ACPI driver 248 may be inserted into a driver stack to add functionality to the hardware device.

In one embodiment, the ACPI driver 248 creates a filter Device Object (filter DO) or a Physical Device Object (PDO) in the driver stack for each device described in an ACPI namespace 250. If the device is capable of being enumerated by an element of another subsystem, such as a Plug-n-Play subsystem, that element of the other subsystem may create the PDO for the device and the ACPI driver 248 may put a filter DO on top of the PDO. The operating system 240 provides power management features to the device stack by means of these device objects.

The ACPI BIOS 254 refers to the portion of system firmware that is compatible with the ACPI specification. The ACPI BIOS 254 manages the boot-up process for the computing system 200 the machine and implements interfaces for power and configuration operations, such as, e.g., sleep, wake, and some restart operations. ACPI BIOS 254 contains definition blocks used to construct ACPI Tables 256 such as, e.g., the DSDT and the SSDT. Although the BIOS 258 and the ACPI BIOS 254 are illustrated as separate components in FIG. 2, they may be implemented as one component in the computer system 200.

In some embodiments, the ACPI Tables 256 include a Root System Description Table (RSDT), a Differentiated System Description Table (DSDT) and one or more Secondary System Description Tables (SSDTs).

Figure 3:
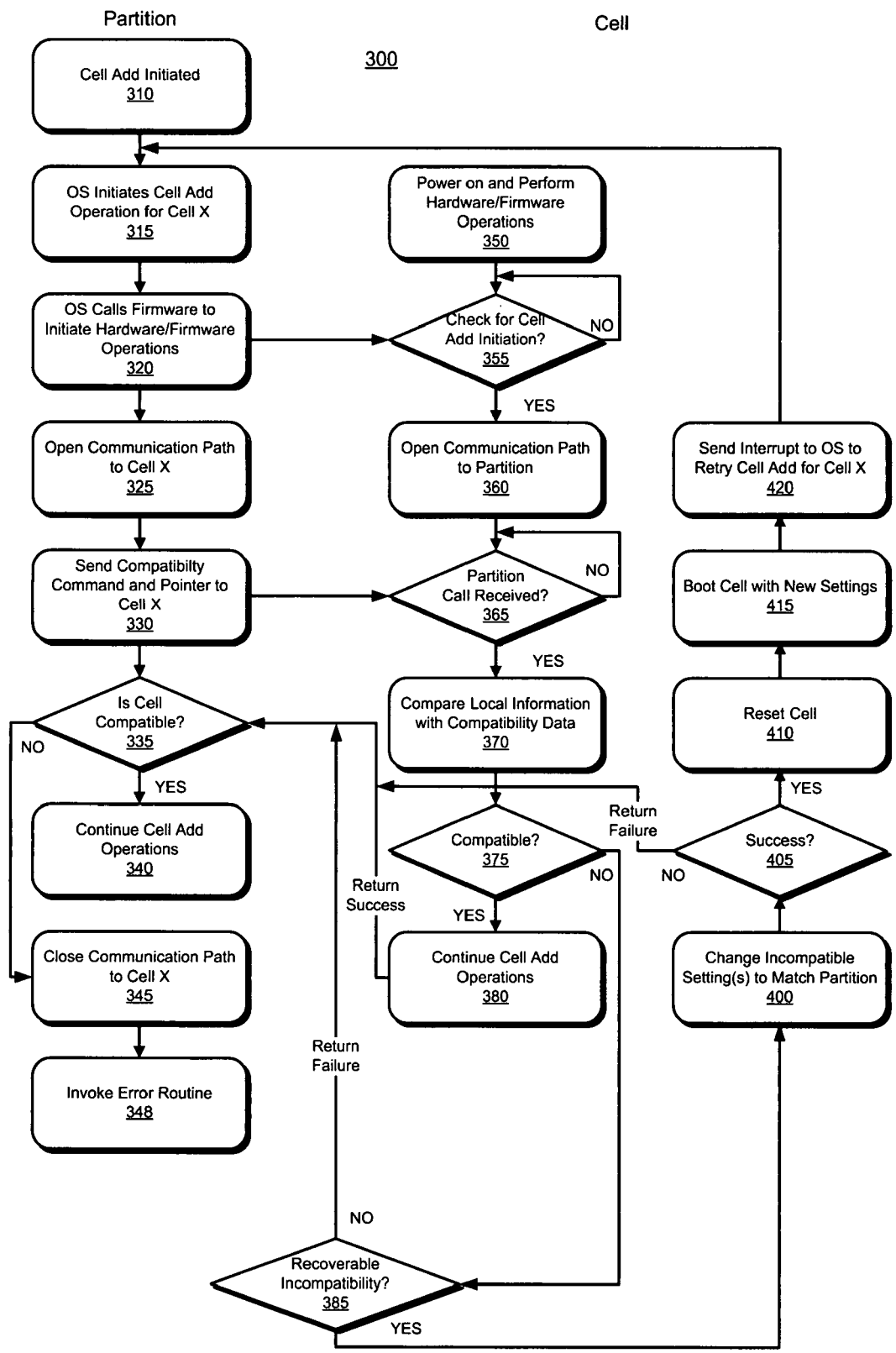
FIG. 3 is a flowchart illustrating operations in a method to allocate/reallocate resources in a multiprocessor computer system according to some embodiments.

As described above, in some circumstances it may be desirable to manage the compatibility of new cells allocated and/or reallocated resources to a first partition in a multiprocessor computer system. FIG. 3 is a flowchart illustrating operations in a method to allocate/reallocate resources in a multiprocessor computer system according to some embodiments. In some embodiments, the operations illustrated in FIG. 3 may be implemented as logic instructions stored on a computer readable medium and executed on one or more processors as part of a process in, for example, an operating system, alone or in combination with system firmware. The methods illustrated in FIG. 3 may be implemented in a multiprocessor computer such as, for example, the computer system 100" depicted in FIG. 1C.

FIG. 3 illustrates one method 300 to manage the addition of one or more cells to a partition in a multiprocessor computer system comprising at least a first partition. In general, in the method 300 a controller in a first partition initiates a request to adding first cell to the first partition. A communication interface is opened between an operating system on the first partition and a firmware module on the first cell. A compatibility command is transmitted from the first partition to the firmware module via the communication interface. In some embodiments, the compatibility command includes a pointer to a compatibility structure which includes compatibility data that may be used by the cell in order to determine whether the cell is compatible with the partition. In the event that the cell is compatible with the partition, the cell may be added to the partition. In the event that the cell is not compatible with the partition, an attempt may be made to change one or more incompatible settings on the cell such that the cell becomes compatible with the first partition. The cell may then be rebooted with the new settings in place, then added to the partition. In the event that incompatible settings cannot be reset the communication path between the cell and the partition is closed and the room operation to add the cell is terminated.

Referring to FIG. 3, operations on the left-hand side of the page, i.e., operations 310 through 345 are implemented by a controller or processor in the partition that is requesting the addition of a cell, identified in FIG. 3 as Cell X. Operations on the right-hand side of the page, i.e., operations 350 through 385 and 400 to 420 are implemented by a controller or processor on the cell. While certain of the operations depicted in the method 300 require cooperation between the partition and the cell, many of the operations require no cooperation and maybe executed independently.

At operation 310 a cell add operation is initiated in the partition. For example, in some embodiments a user of the partition or an administrator of the computer system that implements the partition may initiate a cell add operation in the partition. By contrast, in some embodiments operating conditions in a partition may trigger the partition to initiate a cell add operation. For example, if the processing load on a partition exceeds a threshold or if processing delays exceed a threshold than a partition may automatically initiate an operation to add a cell to the partition. In response to the cell add operation initiated at operation 310, the operating system executing on the partition may initiate a cell add operation for a particular cell, identified in FIG. 3 as cell X (operation 315).

At operation 320 the operating system executing on the requesting partition invokes a call to system firmware to facilitate the cell add operation. For example, in some embodiments the operating system invokes the ACPI to initiate a cell addition. The ACPI facilitates the reallocation by means of a Device Specific Method (DSM), which provides device specific control functions to devices in the computer system 200 and is executed in response to a _DSM function call.

More particularly, the DSM method, which can be used to perform resource allocation/reallocation for any device in the computer system 200, is performed based upon four arguments, namely, a UUID (Universal Unique Identifier), a Revision ID, a Function Index and Arguments. The UUID is a 128 bit buffer that differentiates the various functions that can be performed on a device in the computer system 200 using the _DSM function call. The Revision ID is unique to the UUID and provides a revision for a function. The Function Index is a number, the meaning of which is unique to the UUID and the Revision ID. When the Function Index is equal to 0, this is indicative of a special query function that returns a buffer specifying all the different function indices that are supported by the computer system 200 for a specified UUID and Revision ID. When the Function Index takes on a non-zero value, is function-specific depending upon the UUID and Revision ID. The DSM method can be placed at any device level that is visible to the OS so that resources currently not visible to the OS can also be added.

Referring briefly to operations implemented by the cell, at operation 350 cell is powered on and implements one or more hardware and/or firmware set up operations. In addition, the cell may execute one or more self test operations. At operation 355 the cell enters a state in which it monitors for a cell add initiation operation. In the event that no cell add initiation operation is received, the cell may remain in a monitoring state.

By contrast, in the event that the cell add operation initiated by the partition in operations 315 and 320 is received in the cell, control then passes to operation 360 opens a communication path to the requesting partition. Similarly, at operation 325 the partition opens a communication path to cell X. In some embodiments, the communication path may comprise a communication interface that permits the operating system, alone or in combination with firmware in the partition to communicate with firmware operational on cell X. For example, the communication interface may permit communication with compatibility firmware 122 associated with cell controller 120 depicted in FIG. 1D.

After the cell opens a communication path to the partition, the cell enters a state in which it monitors the communication path for commands from the requesting partition (operation 365). At operation 330 the partition sends a compatibility command to the cell. In some embodiments, the compatibility command includes a pointer to a compatibility data structure maintained by the partition. The compatibility data structure comprises data that specifies one or more characteristics which the cell must possess in order to be compatible with the partition. For example, the data may include specific revisions of firmware or software on the cell, hardware identifiers, processor models, configuration settings, and the like.

At operation 370 the cell compares the compatibility data in the compatibility structure maintained by the partition with corresponding data pertaining to the characteristics of the cell in its current configuration. If, at operation 375, the data indicates that cell is compatible with the partition then control passes to operation 380 in the cell continues operations to add the cell to the partition. In addition, at operation 380 the cell transmits a reply to the partition which indicates that the compatibility test was a success. The success response is input to the test in the partition at operation 335. In the event that the cell returns a successful compatibility test control passes to operation 340 and the partition continues operations to add the cell to the partition.

By contrast, if at operation 375 the cell is not compatible with the partition than control passes to operation 385 where it is determined if the source or sources of incompatibility between the cell and the partition are recoverable. In the event that the incompatibility is not recoverable, for example if the incompatibility stems from a hardware mismatch between the partition and the cell, the cell transmits a reply to the partition which indicates that the compatibility test was a failure. The failure response is input to the test in the partition at operation 335. In the event that the cell returns a failure compatibility test, control passes to operation 345 and the partition closes the communication path to the cell. In some embodiments, the partition may invoke an error routine (operation 348). The error routine may include, for example, presenting an indicator that the cell add operation has failed on a user interface such as, for example, a display 204. The error routine may further include generating an entry in a cell compatibility data file which may be stored in a memory module such as memory module 230 of the computer system. The entry may include one or more identifiers associated with the partition, one or more identifiers associated with the cell that was the object of the cell add operation, and one or more codes indicating the source or sources of incompatibility between the partition and the cell.

By contrast, if at operation 385 the source or sources of incompatibility between the cell and the partition are recoverable, and control passes to operation 400. For example, in some circumstances a firmware or software revision mismatch may be the source of incompatibility between the cell and the partition. Alternatively, one or more configuration settings may be the source of incompatibility between the cell and the partition.

At operation 400, the source or sources of incompatibility are changed to match the compatibility requirements of the partition which requested the cell addition. For example, a firmware revision may be implemented on the cell. Alternatively, one or more configuration settings may be reset on the cell.

In the event that the changes to the incompatible settings are unsuccessful, the cell transmits a reply to the partition which indicates that the compatibility test was a failure. The failure response is input to the test in the partition at operation 335. In the event that the cell returns a failure compatibility test, control passes to operation 345 and the partition closes the communication path to the cell. In some embodiments, the partition may invoke an error routine (operation 348), as described above.

By contrast, is that operation 405 changes to the incompatible settings are successful, then the cell is reset that operation 410 and rebooted with the new settings that operation 415. and operation 420 the cell transmits an interrupt to the operating system of the partition that initiated the cell add operation instructing the operating system to retry a cell add operation for this cell. Thus, control passes back to operation 315 in the process is effectively restarted with the new settings in the cell.

Thus, the operations depicted in the method 300 enable a partition and a cell to determine in a cooperative fashion whether the cell is compatible with the partition before cell add operations are implemented, and to attempt to correct sources of incompatibility between the partition and the cell.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Embodiments described herein may be implemented as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Reference in the specification to "one embodiment" or "an embodiment" means that a particular feature, structure, or characteristic described in connection with the embodiment is included in at least one implementation. The appearances of the phrase "in one embodiment" in various places in the specification are not necessarily all referring to the same embodiment.

What is claimed is:

1. A method to manage the addition of one or more cells in a multiprocessor computer system comprising at least a first partition having a first operating system comprising:
    initiating, in a the first partition, a request to add a first cell to the first partition;
    opening a communication interface between the first operating system and a firmware module on the first cell;
    transmitting from the first partition to the first cell a compatibility command;
    determining, in the first cell, whether the first cell is compatible with the first partition; and
    adding the first cell to the first partition in response to a determination that the first cell is compatible with the first partition.

2. The method of claim 1, wherein:
    the first partition maintains a compatibility structure; and
    the compatibility structure includes revision data for at least one of a hardware device in the cell or a firmware module on the first cell, and configuration data for a device on the first cell.

3. The method of claim 2, wherein transmitting from the first partition to the first cell a compatibility command comprises transmitting a pointer to the compatibility structure.

4. The method of claim 1, further comprising rejecting the first cell in response to a determination that the first cell is incompatible with the first partition.

5. The method of claim 1, further comprising:
    determining, in response to a determination that the first cell is incompatible with the first partition, whether an incompatibility between the first cell and the first partition is recoverable; and
    in response to a determination that the incompatibility is recoverable, changing one or more settings on the first cell.

6. The method of claim 5, further comprising:
    rebooting the first cell using one or more new settings; and
    transmitting an interrupt from the first cell to the first partition, wherein the interrupt prompts the first operating system to retry adding the first cell.

7. The method of claim 1, further comprising:
    determining, in response to a determination that the first cell is incompatible with the first partition, whether an incompatibility between the first cell and the first partition is recoverable; and
    in response to a determination that the incompatibility is irrecoverable, closing the communication path between the first partition and the first cell.

8. A multiprocessor computer system comprising:
    at least a first partition having a first operating system comprising logic in the first partition to:
        initiate a request to add a first cell to the first partition;
        open a communication interface between the first operating system and a firmware module on the first cell; and
        transmit from the first partition to the first cell a compatibility command;
    logic in the first cell to determine whether the first cell is compatible with the first partition; and
    logic in the first partition to add the first cell to the first partition in response to a determination that the first cell is compatible with the first partition.

9. The computer system of claim 8, wherein:
    the first partition maintains a compatibility structure; and
    the compatibility structure includes revision data for at least one of a hardware device in the cell or a firmware module on the first cell, and configuration data for a device on the first cell.

10. The computer system of claim 9, further comprising logic in the first partition to transmit a pointer to the compatibility structure with the compatibility command.

11. The computer system of claim 8, further comprising logic in the first partition to reject the first cell in response to a determination that the first cell is incompatible with the first partition.

12. The computer system of claim 8, further comprising logic in the first partition to:
    determine, in response to a determination that the first cell is incompatible with the first partition, whether an incompatibility between the first cell and the first partition is recoverable; and
    in response to a determination that the incompatibility is recoverable, change one or more settings on the first cell.

13. The computer system of claim 12, further comprising logic in the first cell to:
    reboot the first cell using one or more new settings; and
    transmitting an interrupt from the first cell to the first partition, wherein the interrupt prompts the first operating system to retry adding the first cell.

14. The computer system of claim 8, further comprising logic in the first partition to:
    determine, in response to a determination that the first cell is incompatible with the first partition, whether an incompatibility between the first cell and the first partition is recoverable; and
    in response to a determination that the incompatibility is irrecoverable, close the communication path between the first partition and the first cell.

* * * * *

UNITED STATES PATENT AND TRADEMARK OFFICE
CERTIFICATE OF CORRECTION

| | | |
|---|---|---|
| PATENT NO. | : 7,984,150 B2 | Page 1 of 1 |
| APPLICATION NO. | : 11/888269 | |
| DATED | : July 19, 2011 | |
| INVENTOR(S) | : Nathan Jared Hughes et al. | |

It is certified that error appears in the above-identified patent and that said Letters Patent is hereby corrected as shown below:

On the Title page, in field (54), Title, in column 1, line 1, delete "COMPATIBILTY" and insert -- COMPATIBILITY --, therefor.

In column 1, line 1, delete "COMPATIBILTY" and insert -- COMPATIBILITY --, therefor.

In column 9, line 15, in Claim 1, delete "a the" and insert -- the --, therefor.

In column 8, lines 12 – 13, delete the ".".

Signed and Sealed this
Twenty-seventh Day of December, 2011

David J. Kappos
*Director of the United States Patent and Trademark Office*